(12) United States Patent
Jerdev et al.

(10) Patent No.: US 7,881,595 B2
(45) Date of Patent: Feb. 1, 2011

(54) IMAGE STABILIZATION DEVICE AND METHOD

(75) Inventors: Dmitri Jerdev, South Pasadena, CA (US); Igor Subbotin, South Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 227 days.

(21) Appl. No.: 12/004,410

(22) Filed: Dec. 21, 2007

(65) Prior Publication Data

US 2009/0162045 A1 Jun. 25, 2009

(51) Int. Cl.
*G03B 17/00* (2006.01)
*G03B 13/18* (2006.01)

(52) U.S. Cl. .............................. 396/55; 396/54; 396/96

(58) Field of Classification Search ............. 396/52–55, 396/96, 99, 246; 348/208.99, 208.1, 208.6, 348/208.12, 208.16, 229.1, 296, 297, 362
See application file for complete search history.

(56) References Cited

U.S. PATENT DOCUMENTS

| 6,140,630 | A | 10/2000 | Rhodes |
| 6,204,524 | B1 | 3/2001 | Rhodes |
| 6,310,366 | B1 | 10/2001 | Rhodes et al. |
| 6,326,652 | B1 | 12/2001 | Rhodes |
| 6,333,205 | B1 | 12/2001 | Rhodes |
| 6,376,868 | B1 | 4/2002 | Rhodes |
| 2004/0239795 | A1* | 12/2004 | Kitajima ..................... 348/362 |
| 2008/0080846 | A1* | 4/2008 | Grip ............................ 396/51 |
| 2008/0291288 | A1* | 11/2008 | Tzur et al. ............... 348/222.1 |

* cited by examiner

*Primary Examiner*—W. B. Perkey
*Assistant Examiner*—Minh Q Phan

(57) ABSTRACT

An imaging device and processes to provide image stabilization by controlling analog gain and integration time. Analog gain and integration time for images are determined by comparing an image in various frames, whether full frames or hidden frames, where the image is provided with differently set analog gain and integration time settings to determine settings for stabilized image capture.

7 Claims, 7 Drawing Sheets

IMAGE STABILIZATION DEVICE AND METHOD

FIELD OF THE INVENTION

Disclosed embodiments relate to imaging devices and methods. Specifically, embodiments relate to imaging devices and methods performing image stabilization.

BACKGROUND

Solid state imaging devices, including charge coupled devices (CCD), complementary metal oxide semiconductor (CMOS) imaging devices, and others, have been used in photo-imaging applications. A solid state imaging device circuit includes a focal plane array of pixel cells, or pixels, as an image sensor, each pixel includes a photosensor, which may be a photogate, photoconductor, a photodiode, or other photosensor having a doped region for accumulating photo-generated charge.

For CMOS imaging devices, each pixel has a charge storage region, formed over or in a substrate, which is connected to a gate of an output transistor, which is part of a readout circuit. The charge storage region can be constructed as a floating diffusion region. In some CMOS imaging devices, each pixel may further include at least one electronic device, such as a transistor, for transferring charge from the photosensor to the storage region and one device, also typically a transistor, for resetting the storage region to a predetermined charge level prior to charge transference. CMOS imaging devices of the type discussed above are discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, each assigned to Micron Technology, Inc. Imaging devices are typically incorporated into a larger device, such as a digital camera or other imaging apparatus, which may also include image processing and memory circuitry to provide an output image.

In digital photography, ISO, also called analog gain, denotes how sensitive the image sensor is to the amount of light present. The higher the ISO, the more sensitive the image sensor, enabling it to take pictures in low-light situations. A camera's ISO function sets the light sensitivity of the camera's image sensor (this is similar to the speed rating of film). ISO settings are often rated at 100, 200, or 400, often including intermediate values of these settings, but can go as high as 800, 1600, and even 3200 on some advanced camera models. A lower ISO setting is used when capturing overly bright scenes, since it reduces the light sensitivity of the image sensor. A higher ISO setting is often used when shooting under dimmer conditions (cloudy days, indoors, etc.) since it increases the light sensitivity of the image sensor. At lower ISO settings images are captured with larger exposure periods which captures more light, but which also increases the risk of motion blur.

A desired feature in all modern digital cameras, even low-end camera-on-chip models, is image stabilization, resulting in reduced image blurring. Image stabilization is the ability of the camera to avoid image smear of objects in the field of view, which can be caused by camera shaking or by movements of the objects themselves. Image stabilization is desirable particularly when longer exposure periods are used. One way image stabilization has been implemented is by increasing the analog gain applied to pixel signals, while correspondingly reducing exposure (integration) time. This results in less image smearing and sharper pictures. However, this reduction in exposure time can cause image noise to increase. Some current methods of image stabilization also rely on extra hardware in the camera.

An image device and method providing image stabilization, which may include camera movement sensing circuits, lens control devices, additional software processing and other components, that does not cause an unacceptable image noise increase, and which relies on existing image capture and processing software, is desirable.

DETAILED DESCRIPTION

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

Embodiments disclosed herein relate to compensating for relative motion of a subject and camera in digital photography. Disclosed embodiments utilize a processor, e.g., an image processor or a separate camera control processor, which is already used for ISO speed and auto-focus functionality, with minor adaptations to mitigate image blur caused by relative subject-camera motion. The disclosed embodiments utilize comparisons of image blurriness in the form of image sharpness score on successive image capture to determine appropriate analog gain and integration time to minimize blur and increase sharpness and stabilize the image for image capture.

The embodiments described herein rely on successfully captured images for analysis of image sharpening and for corresponding adjustments in the image capture process to mitigate blur. The disclosed embodiments can be used with any type of imaging pixel technology, e.g., CMOS, CCD, and others. Although analog gain and integration time may be adjusted based on blurriness comparisons, per the embodiments disclosed herein, other exposure settings are determined by the camera independent of the changes to analog gain and integration time and are based on an exposure algorithm to determine proper exposure as is known in the art.

Figure 1:
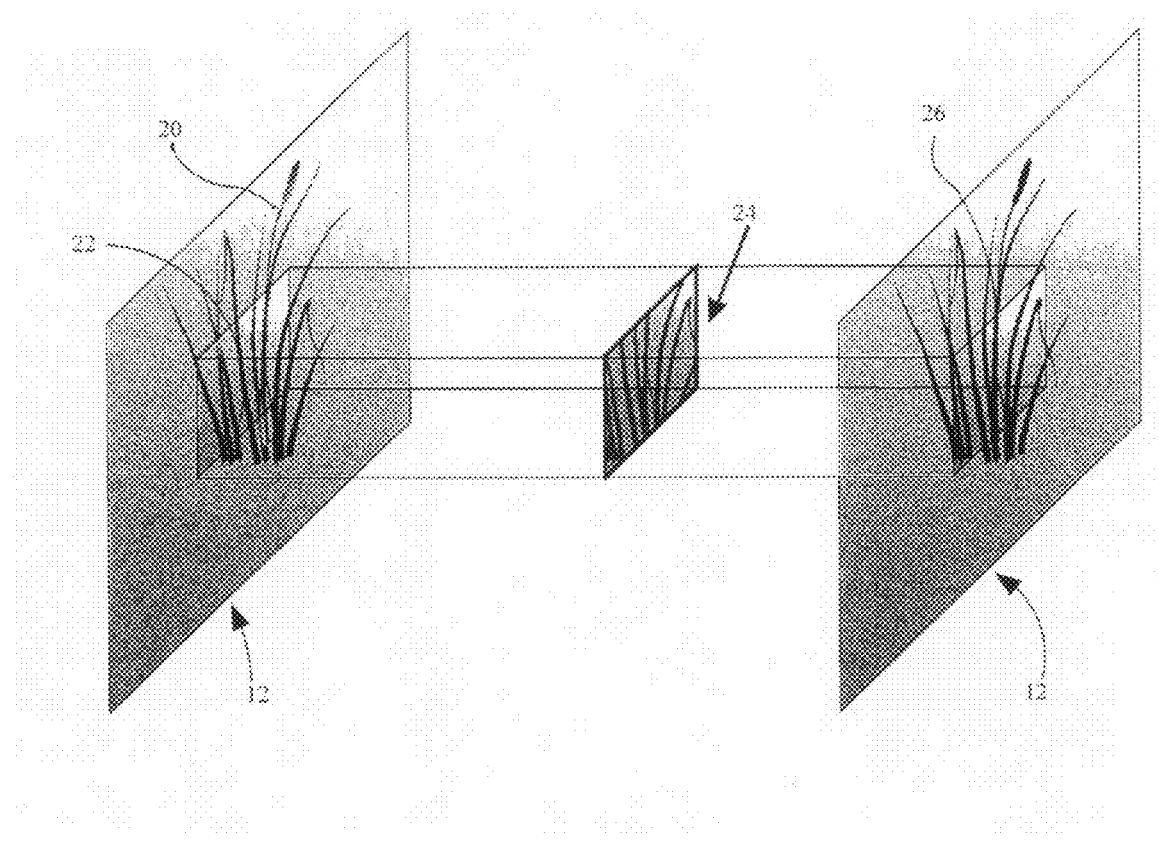
FIG. 1 is a representation of the use of full and hidden frames for image stabilization determination.

FIG. 1 shows a first embodiment using hidden frames 24 for image stabilization. Between full frames 20, 26 of an image 12 captured by an imaging array 10 (FIG. 6), which comprises a plurality of pixels arranged in rows and columns, a hidden frame 24 is captured as well for sharpness comparisons with other captured images 12. The hidden frame 24 is captured between regular full-size frames 20, 26. The hidden frame 24 is used to estimate sharpness in a particular area of the image 12, defined as the region of interest 22, using sensor settings (gain an integration time) chosen to provide image sharpness. The image captured within the hidden frame 24 is not sent to the final user. Only full size frames, e.g., frames 20 and 26, are sent to the output intended for the final user. In one embodiment, at least one hidden frame 24 is inserted between the two full-size frames 20, 26, however a plurality of hidden frames 24 can be utilized as well.

The hidden frame 24 may only cover the image 12 region of interest 22, which is preferably a subset of pixels of the array 10 receiving a portion of the image 12 with high edge content. The region of interest 22 can be selected by a processor 602 (FIG. 7) based on an analysis of statistics from a plurality of sets of sub-windows used in a known statistics analysis for the regular full frame 20 relating to auto-focusing.

To estimate a sharpness score for the best achievable image stabilization in the image 12 the hidden frame 24 utilizes the highest possible analog gain and a correspondingly small integration time. In order to calculate a sharpness score inside this hidden frame 24, the sub-window digital filtering operation is performed on the pixel data within the hidden frame 24. A known derivative filter used by the imaging device, e.g., camera 600 (FIG. 7) for auto-focus ("AF") functions, can be used for this digital filtering operation. Either first derivative or second derivative filters, as known in the art, can be used for determining the sharpness score in accordance with this embodiment. For example, first derivative filter, such as a Sobel filter, as shown by Equation 1 below, may be used.

$$[h_x] = \frac{1}{4}\begin{bmatrix} 1 & 0 & -1 \\ 2 & 0 & -2 \\ 1 & 0 & -1 \end{bmatrix} = \frac{1}{4}\begin{bmatrix} 1 \\ 2 \\ 1 \end{bmatrix} \cdot [1 \ 0 \ -1] \quad \text{(Eq. 1)}$$

$$[h_y] = \frac{1}{4}\begin{bmatrix} 1 & 2 & 1 \\ 0 & 0 & 0 \\ -1 & -2 & -1 \end{bmatrix} = \frac{1}{4}\begin{bmatrix} 1 \\ 0 \\ -1 \end{bmatrix} \cdot [1 \ 2 \ 1]$$

where $h_x$ denotes a horizontal derivative filter (matrix) and $h_y$ denotes a vertical derivative filter (matrix). A second derivative filter, such as a Laplacian filter, as expressed by Equations 2, 3, and 4 below, may alternatively be used. The Laplacian is defined as:

$$\nabla^2 a = \frac{\partial^2 a}{\partial x^2} + \frac{\partial^2 a}{\partial y^2} = (h_{2x} \otimes a) + (h_{2y} \otimes a) \quad \text{(Eq. 2)}$$

where $h_{2x}$ and $h_{2y}$ are second derivative filters. In a frequency domain for the Laplacian filter, $\nabla^2 a$ can be defined by Equation 3, below:

$$\nabla^2 a \overset{F}{\leftrightarrow} -(u^2 + v^2)A(u, v) \quad \text{(Eq. 3)}$$

where the transfer function of the Laplacian corresponds to a parabola $(u,v)=-(u^2+v^2)$. A basic second derivative filter is defined by Equation 4, set forth below:

$$[h_{2x}] = [h_{2y}]^t = [1 \ -2 \ 1] \quad \text{(Eq. 4)}$$

The above or other known derivative filters can be used in the conventional manner for identifying regions of high edge content for calculating sharpness, as known in the art, to identify degrees of blurriness in captured images. Such a process can use algorithms for calculating sharpness score as is known in the art. The blurriness, or sharpness, score provided by such filters is used in the embodiments disclosed herein, in conjunction with analog gain and integration time settings, to identify and improve image quality. Use of second derivative filter is desirable where a motion vector is directed along a Y image axis. Although, as noted, first and second derivative filters are used for focus camera operations, it should be noted that such filters are also used for other image processing and/or camera functions, as a further example, such filters are often used to produce an aperture value for digital image processing applications. If a derivative filter is available in an image processor and/or a camera processor 602 (FIG. 7), as is often the case, the only hardware modification necessary for the implementation of this embodiment is the addition of a register 603 (FIG. 7) to store a combined e.g., average filter score for all pixels across the region of the interest 22, i.e., within a sub-window.

The filter score can be calculated across the same region of interest 22 of the image 12 in both full 20, 26 and hidden 24 frames. If motion is present in the image 12, the sharpness score inside the hidden frame 24 should generally be higher than that obtained for the regular frame 20 since the image 12 in the hidden frame 24 is taken with a smaller integration time and higher gain setting and, so, should have less blur. Accordingly, if the sharpness score for the hidden frame is greater than that for a full image frame, e.g., 20, then the gain and integration finish is adjusted to produce increased sharpness for the next frame, e.g., captured. In such a case, analog gain is increased for the full frame 26 in order to decrease integration time which will result in less image blur. Blur value, or sharpness score, is proportional to integration time in accordance with Equation 5, as follows:

$$G_h \cdot T_h = G_r \cdot T_r \quad \text{(Eq. 5)}$$

In Equation 5, $G_h$ and $G_r$ are analog gains for hidden 24 and full frames 20, 26, respectively, and $T_h$ and $T_r$ are integration times for hidden 24 and full frames 20, 26, respectively. The amount of the gain increase and corresponding decrease in the integration time depends on the difference between sharpness scores determined for the full 20, 26 and hidden 24 frames. The dependence of this score on motion is calibrated for the particular filter type used to determine the sharpness score based on analysis of score vs. motion blur. It is possible that there will be no common solution that could apply to all the possible filter types and that each would have a specific solution related to the motion perceived. This score can also be normalized by the number of pixels in region of interest 22 to produce an average sharpness value per pixel, which can be compared between windows of different size, if desired.

If no motion or shaking occurs between the full frame 20 and hidden frame 24, then scores calculated for the region of interest 22 should be very similar in both cases and no adjustment to the analog gain or integration time for the full frame is needed. Basically, similar sharpness scores is an indication that the picture 12 is steady and no stabilization is needed.

Figure 2:
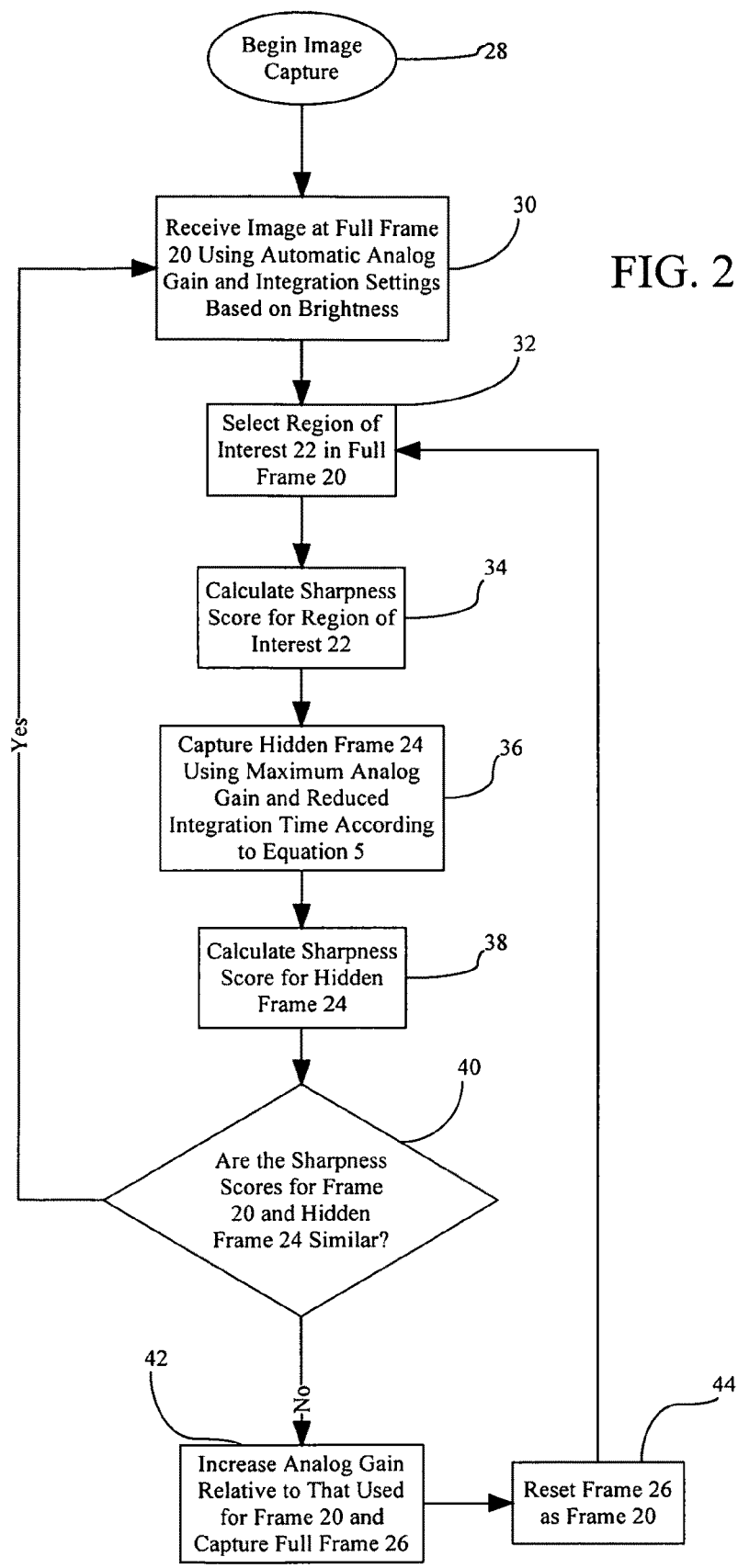
FIG. 2 is a flowchart illustrating a method for determining image stability settings.
Figure 6:
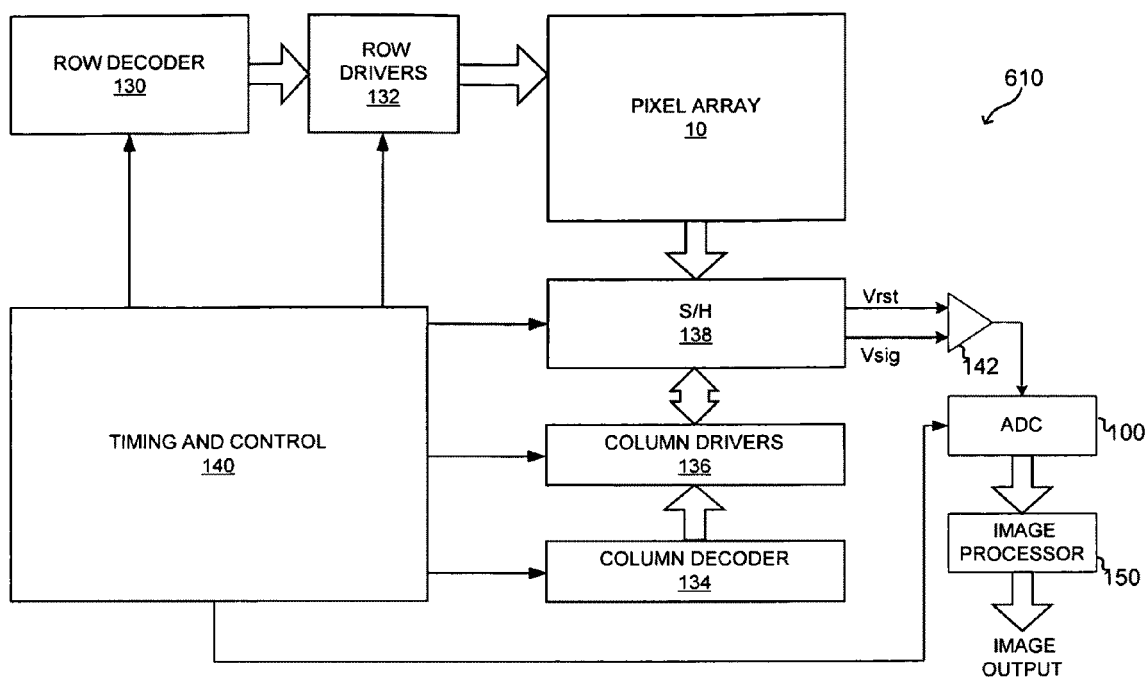
FIG. 6 shows an imaging device in accordance with the disclosed embodiments.
Figure 7:
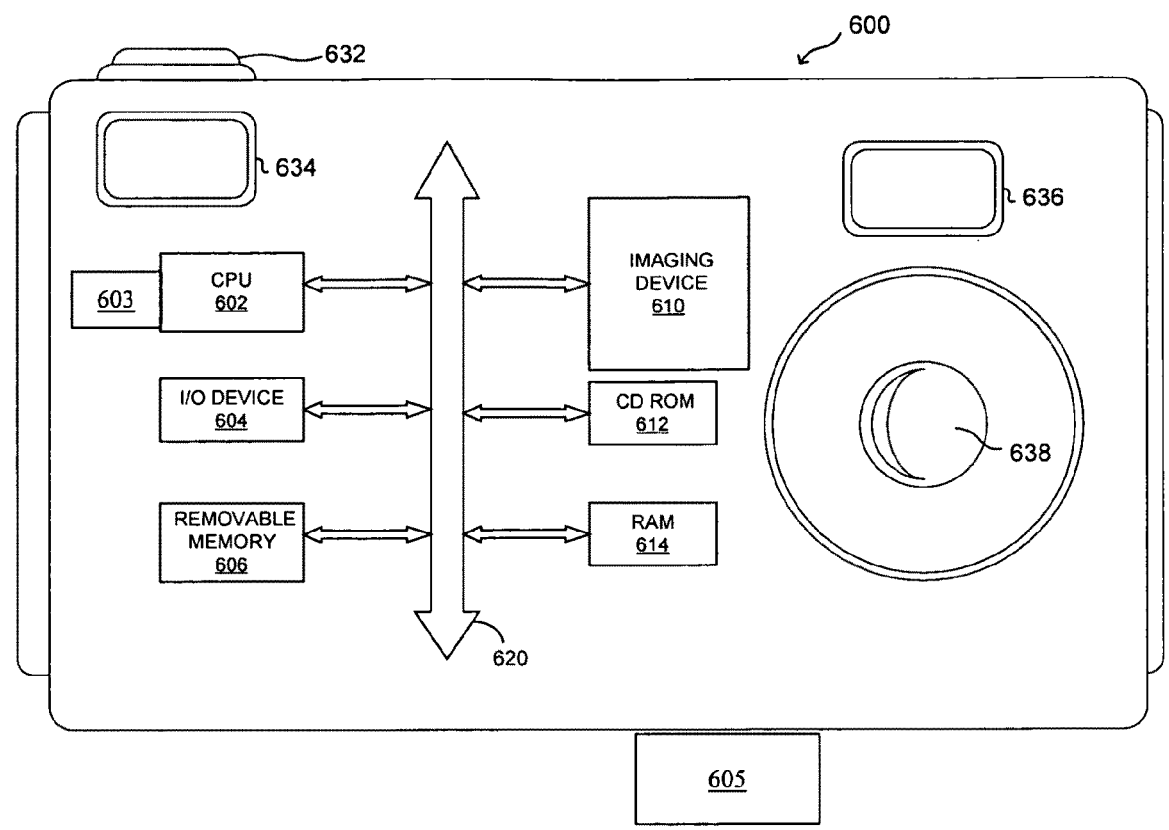
FIG. 7 shows a camera system, which employs an imaging device and processor in accordance with the disclosed embodiments.

FIG. 2 shows a method which can implement the embodiment such as discussed above in relation to FIG. 1. The process begins at step 28, where image capture begins and an image 12, such as shown in FIG. 1, is received on a pixel array 10 (FIG. 6). The image 12 is captured as a first full frame 20 at step 30. This first full frame 20 is captured using analog gain and integration time settings based on an exposure setting determined by image brightness as automatically determined by a processor 602 (FIG. 7). In the absence of motion, in bright light, the gain would normally be 1. A region of interest 22 of the full frame 20 is selected for its high edge content, which can be determined using a first or second derivative filter, such as expressed above at Equations 1-4. Next, at step 34, a sharpness score is calculated (using a sharpness filter of choice as know in the art or available at a processor within a camera) for the region of interest 22 of the full frame 20 (FIG. 1). In the case where motion occurs in the image 12, the region of the interest 22 would be blurry and have a low sharpness score due to object motion or camera shaking.

At step 36, a hidden frame 24 corresponding to the region of interest 22 is captured using maximum analog gain and a correspondingly reduced integration time corresponding to an exposure set by the camera for image capture. Due to the reduced integration time in this hidden frame 24 (reduction of integration time is proportional to the gain increase per Equation 5) motion blur should be reduced and the sharpness score is calculated for the hidden frame 24 at step 38. The same sharpness filter should be used as was used for step 34.

At step 40, the sharpness score calculated for the first full frame 20 (at step 34) is compared to the sharpness score calculated at step 38 for the hidden frame 24. If the two sharpness scores are similar, meaning that the difference is within a predetermined value range, then the full frame 20 is considered stable and no image stabilizing action need be taken to improve image stability. The method continues at step 30 and another full frame 20 is captured and analyzed using the same analog gain and integration time settings based on set exposure parameters based on the brightness of the scene.

If, however, in step 40 the two sharpness scores are not similar in that the difference sharpness value is outside a predetermined range, the process moves to step 42 where analog gain is increased relative to the settings at step 30 and integration time is corresponding reduced and another full frame 26 is captured with the new setting. The new combination of gain and integration remains within values which give the same exposure for a captured image as originally set by the camera. This new frame 26 is then reset as a new frame 20, (step 44) and using the newly captured image the method continues to step 32 where a region of interest 22 is selected. The method proceeds to determine sharpness scores and adjust analog gain and integration time, if needed, as discussed above.

Using this method, analog gain and integration time are adjusted to provide best picture quality in term of blur/noise trade off and within the exposure set by the camera. In this embodiment, the system and method do not require any additional structures for image stabilization except for a memory for storing sharpness scores for comparison. The system and method provide less than full frame auxiliary hidden frames 24 inserted between regular frames 20, 26 that can have different gain and integration time settings and which provide sharpness statistics which can be quickly determined and hidden.

Figure 5:
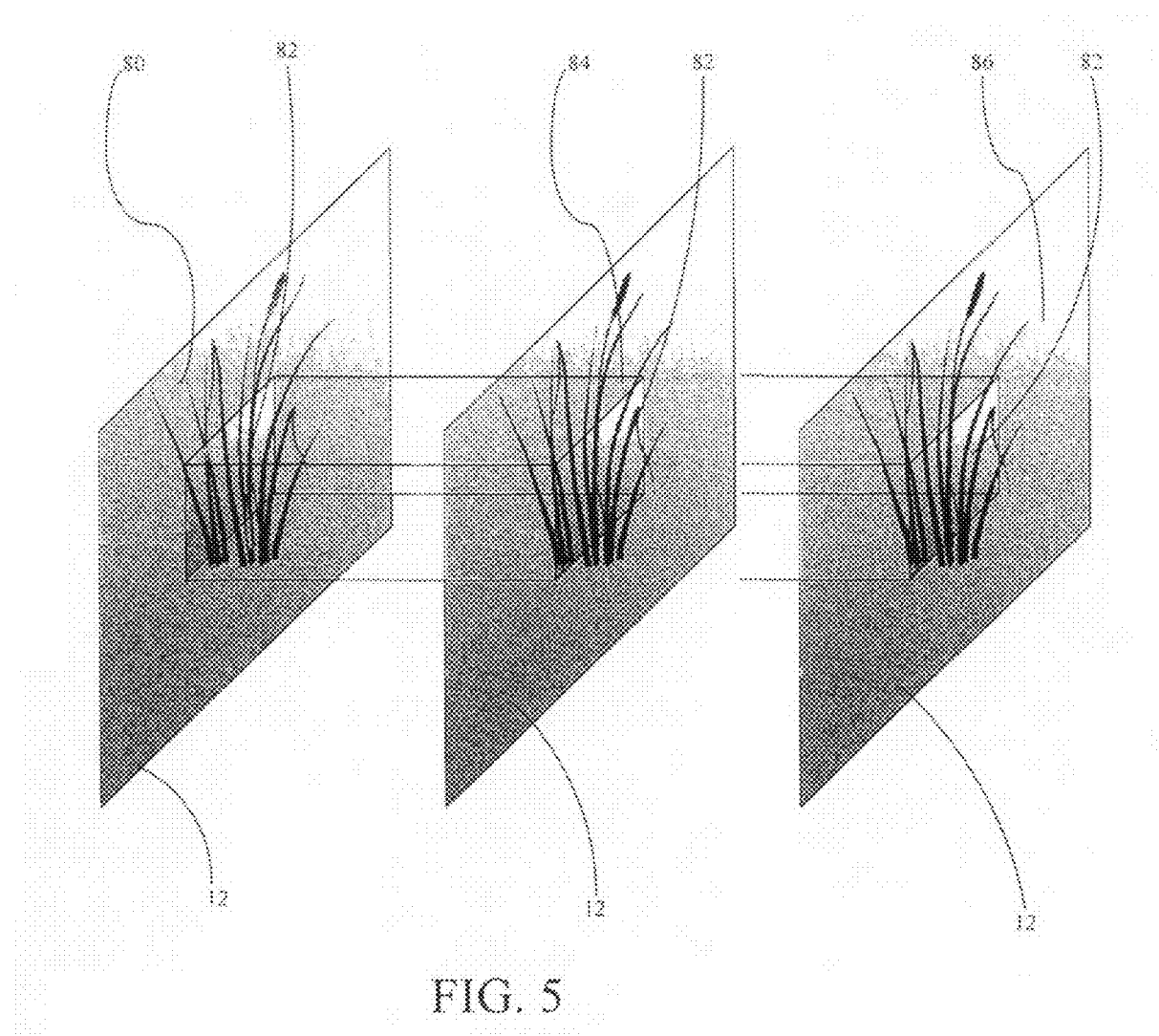
FIG. 5 is a representation of the use of a series of image frames for image stabilization determination.

In another embodiment, hidden frames 24, such as described above in relation to FIGS. 1 and 2, are not used. This alternative approach utilizes an estimate of the image sharpness using two or more sequential frames 80, 84, 86 for image blur, as shown in FIG. 5. Each image is taken with a different analog gain and integration time. These frames 80, 84, 86 are used to estimate sharpness in a particular area, e.g., sub-window 82, of the image 12. Any motion of the subject or camera will increase blur present in the frames having a larger integration time. This will causes sharpness filter score, which is obtained using a derivative filter as discussed above in Equations 1-4, to decrease, which makes an assessment of motion and respective need for stabilization possible.

Figure 3:
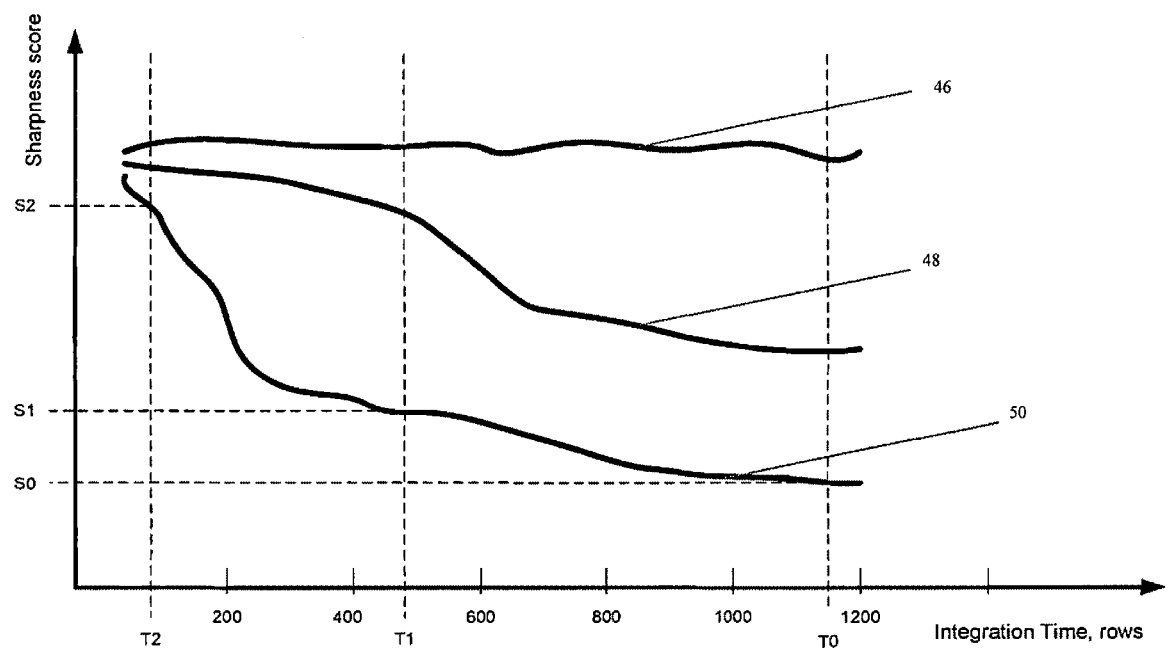
FIG. 3 illustrates the use of sharpness score and integration time in determining image stability.
Figure 4:
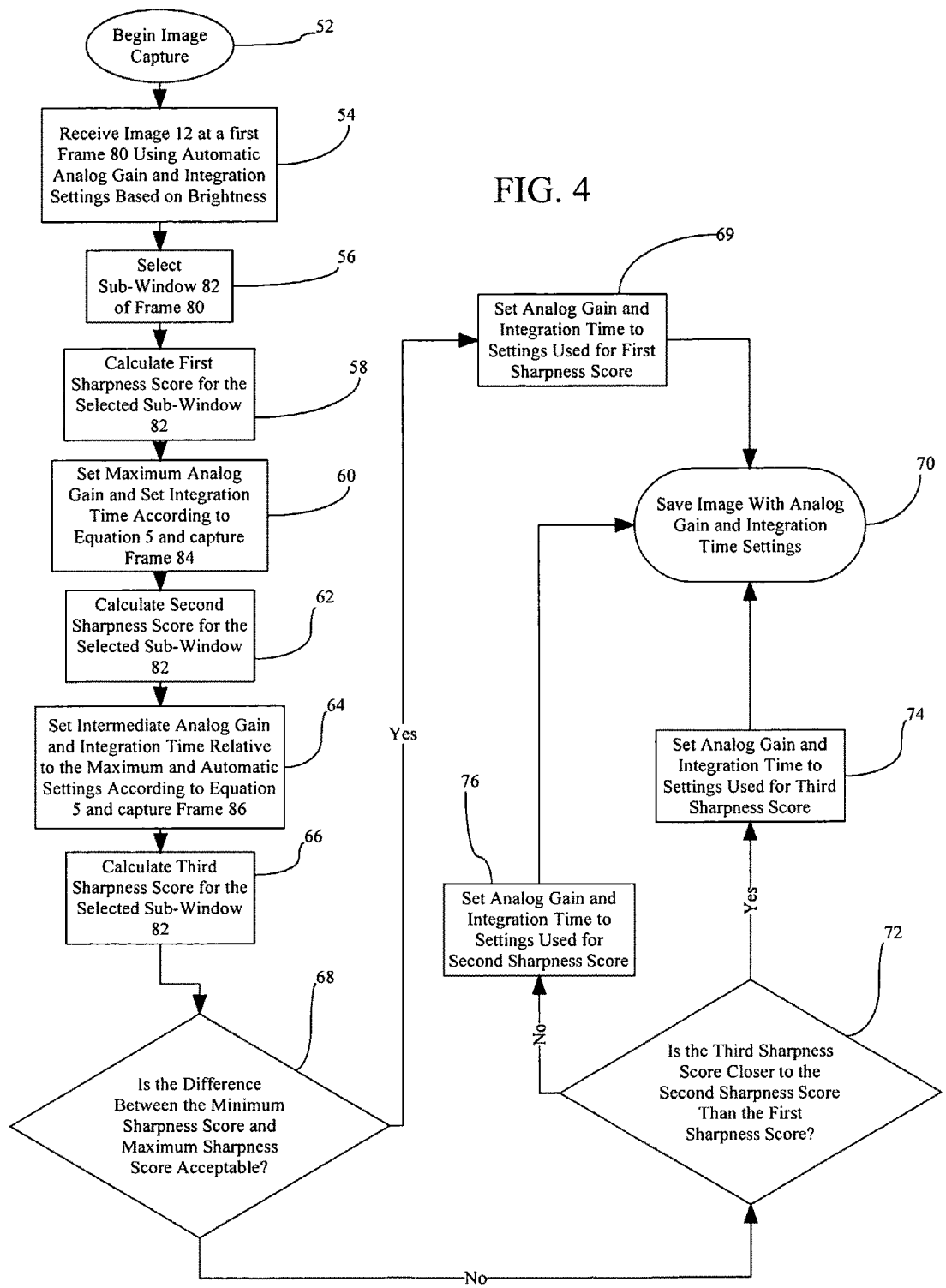
FIG. 4 is a flowchart illustrating a method for determining image stability settings.

FIG. 3 is a graph showing three examples of sharpness score vs. integration time (per row of an array 10) most specifically in accordance with the embodiment shown in FIG. 5; however, the examples shown in FIG. 3 are also useful in accordance with the embodiment shown in FIG. 1, as would be apparent to those of skill in the art. The top most line 46 represents an image 12 with very little or no relative motion between the subject and camera 600. Line 46 shows that the sharpness score changes very little over a large variation of integration time. The middle line 48 represents some, slow relative motion in the captured image 12, between the subject and camera 600. The bottom line 50 represents more or faster relative motion, between the subject and camera 600. Line 50 shows that the sharpness score drastically changes over a change in integration time. As an example, S0 represents a sharpness score for a first frame 80 (FIG. 5) captured with minimum analog gain and maximum integration time, the sharpness score S2 is for a second frame 84 (FIG. 5), captured using maximum analog gain and minimum integration time, and the sharpness score S1 is for a third frame 86 (FIG. 5), using an intermediate analog gain and an intermediate integration time. Sharpness scores, such as S0, S1, and S2, can be used with a method as illustrated in FIG. 4, discussed below.

For the method to operate, it is sufficient to collect an AF filter score from a small fraction of the image 12 (e.g., about 2-10%) as a sub-window 82 of the pixel array 10 (FIG. 6). In order to achieve the best performance, it is preferred that the sub-window 82 have a high edge content. The sub-window 82 can be, for example, selected by a CPU 602 (FIG. 7) based on analysis of the statistics from sets of sub-windows 82 used in the statistics analysis in the regular frame 80 relating to edge content.

In order to perform a motion assessment, at least two sequential image 12 frames 80 and 84 are analyzed. One frame 80 is taken with regular, noise optimized gain (lowest possible gain) and the second frame 84, a gain boosted frame, is taken with a highest possible gain and lowest possible integration time. Assuming that there is constant camera 600 (FIG. 7) motion during these two frames 80, 84, the amount of resulting smear would differ proportionally to the ratio of analog gains used. The gain ratio can reach 16 or even higher. A larger gain ratio provides better performance in determining need for image stabilization. The use of the described stabilization is particularly advantageous for bright light conditions where an analog gain of 1 is normally used.

In order to determine a sharpness score inside a sub-window 82, a digital filtering operation is performed on the sub-window 82 data. The result of this filtering operation is a sharpness score that reflects the edge content of the image 12 inside the sub-window 82. This score can be normalized per number of pixels inside the sub-window 82 to allow for a comparison among other possible sub-windows of different dimensions. Either first derivative or second derivative filters, as expressed above as Equations 1-4, can be utilized for the sharpness filter. Use of a second derivative filter is, however, desirable in the case that motion vector is directed along Y image axis. Known digital filters can be used to determine the sharpness score such as, for instance, those used to produce aperture value or those used for auto-focus. In either case, assuming that the particular type of filter is already available in the camera 600 processor 602 (FIG. 7), as it is often the case, the only hardware modification necessary for the implementation of this embodiment is the addition of a register to store the combined sharpness score across of the sub-window 82.

The sharpness score can be calculated and compared across the same pre-selected area of two or more blur-assessing frames 80, 84, 86. If motion is present in the image 12, the sharpness score inside the frame 84 with boosted gain should, in general, be higher than that obtained from the regular frame 80 since the image 12 in that frame 84 is taken with smaller integration time and should have less blur. In such a scenario, analog gain is increased for the regular frame 80 in order to decrease integration time producing less blur as a result, in accordance with Equation 5.

If no motion or shaking is perceived in the image 12 based on the comparison of sharpness scores between blur-assessing frames 80, 84, 86 then sharpness scores calculated for the sub-window 82, which is the same for compared frames 80, 84, 86, should be similar in each case and no adjustment to the analog gain for the full frame is needed. Similar scores would be an indication that the picture is steady.

FIG. 4 shows a method that can be used with an embodiment such as the one discussed above in relation to FIGS. 3 and 5. The process begins at step 52 with the initiation of image 12 capture by a device, such as a camera 600, as shown in FIG. 7. At step 54, the image 12 is received as a first frame 80 and is captured using automatic analog gain and integration settings based on brightness of the image 12. In bright light the gain would normally be 1. Next, at step 56, a sub-window 82 of frame 80 is selected based on high edge content. At step 58, the sharpness score is determined for the sub-window 82.

Next, the analog gain is set to a maximum and the integration time is correspondingly reduced in accordance with Equation 5 (step 60). Using these new analog gain and integration time settings, a new frame 84 is captured and the same sub-window 82 is used to calculate a second sharpness score (step 62). At step 64, an intermediate analog gain and corresponding integration time in accordance with Equation 5 between the automatic setting of step 54 and the maximum setting of step 60 is set and a third image 12 frame 86 is captured. A third sharpness score, based on these new settings, is determined at step 66.

The difference between the lowest and highest sharpness scores obtained at steps 58, 62, and 66 is analyzed at step 68 and it is determined whether this difference is acceptable. If it is, meaning the image 12 is sufficiently clear and does not need stabilization, the image is saved with the automatic, brightness-based, analog gain and integration time settings at step 70. Line 46 of the graph in FIG. 3 illustrates such a scenario.

If the highest and lowest sharpness score difference is not acceptable, meaning there is an unacceptable amount of blurriness and image stabilization is needed, the process moves to step 72 where it is determined whether the third sharpness score calculated at step 66 is closer in value to the sharpness score of the first frame 80 as determined at step 58 or closer in value to the sharpness score for the second frame 84 as determined at step 62. If the third sharpness score is closer to that of the first frame 80, as represented by line 48 of FIG. 3 indicating slower motion, the process moves to step 74, where the intermediate analog gain and integration time used for the third frame 86 are set and then at step 70 the image is saved. If the third sharpness score is closer to that of the second frame 84, as represented by line 50 of FIG. 3 indicating faster motion, the maximum analog gain and corresponding integration time settings for the second frame 84 are used and then the image is saved at step 70.

FIG. 6 illustrates a block diagram for a CMOS imager 610 in accordance with the embodiments described above. Although a CMOS imager 610 is specified, as indicated above, any imaging technology can be used, e.g., CCD and others. The imager 610 includes a pixel array 10. The pixel array 10 comprises a plurality of pixels arranged in a predetermined number of columns and rows. The pixels of each row in array 10 are all turned on at the same time by a row select line and the pixel signals of each column are selectively output onto output lines by a column select line. A plurality of row and column select lines are provided for the entire array 10.

The row lines are selectively activated by the row driver 132 in response to row address decoder 130 and the column select lines are selectively activated by the column driver 136 in response to column address decoder 134. Thus, a row and column address is provided for each pixel. The CMOS imager 610 is operated by the control circuit 40, which controls address decoders 130, 134 for selecting the appropriate row and column select lines for pixel readout, and row and column driver circuitry 132, 136, which apply driving voltage to the drive transistors of the selected row and column select lines.

Each column contains sampling capacitors and switches 138 associated with the column driver 136 that reads a pixel reset signal $V_{rst}$ and a pixel image signal $V_{sig}$ for selected pixels. A differential signal (e.g., $V_{rst}$-$V_{sig}$) is produced by differential amplifier 140 for each pixel and is digitized by analog-to-digital converter 100 (ADC). The analog-to-digital converter 100 supplies the digitized pixel signals to an image processor 150, which forms a digital image output.

The signals output from the pixels of the array 10 are analog voltages. These signals must be converted from analog to digital for further processing. Thus, the pixel output signals are sent to the analog-to-digital converter 100. In a column parallel readout architecture, each column is connected to its own respective analog-to-digital converter 100 (although only one is shown in FIG. 6 for convenience purposes).

Disclosed embodiments may be implemented as part of a camera 600 such as e.g., a digital still or video camera, or other image acquisition system. FIG. 7 illustrates a processor system as part of, for example, a digital still or video camera system 600 employing an imaging device 610 (FIG. 6), which can have a pixel array 10 as shown in FIG. 6, and processor 602, which provides focusing commands using blur value in accordance with the embodiments shown in FIGS. 1-5 and described above. The system processor 602 (shown as a CPU) implements system, e.g. camera 600, functions and also controls image flow through the system. The sharpness detection methods described above can be provided as software or logic hardware and may be implemented within the image processor 150 of the imaging device 610, which provides blur scores to processor 602 for auto-focus operation. Alternatively, the methods described can be implemented within processor 602, which receives image information from image processor 150, performs the blur score calculations and provides control signals for an auto-focus operation.

The processor 602 is coupled with other elements of the system, including random access memory 614, removable memory 606 such as a flash or disc memory, one or more input/out devices 604 for entering data or displaying data and/or images and imaging device 610 through bus 620 which may be one or more busses or bridges linking the processor system components. The imaging device 610 receives light corresponding to a captured image through lens 638 when a shutter release button 632 is depressed. The lens 638 and/or imaging device 610 pixel array 10 are mechanically movable with respect to one another and the image focus on the imaging device 610 can be controlled by the processor 602 in accordance with the embodiments described herein. As noted, the blur value can be calculated by an image processor 150 within image device 610 or by processor 602, the latter of which uses the blur value to directly control an auto-focus operation within camera 600, alternatively, processor 602 can provide the blur value or control commands to an auto-focus processor 605 within the camera 600. The auto-focus processor 605 can control the analog gain and integration time for image stabilization in accordance with embodiments described above.

The camera system 600 may also include a viewfinder 636 and flash 634, if desired. Furthermore, the camera system 600 may be incorporated into another device, such as a mobile telephone, handheld computer, or other device.

The above description and drawings should only be considered illustrative of example embodiments that achieve the features and advantages described herein. Modification and substitutions to specific process conditions and structures can be made. Accordingly, the claimed invention is not to be considered as being limited by the foregoing description and drawings, but is only limited by the scope of the appended claims.

What is claimed as new and desired to be protected by Letters Patent of the United States is:

1. A method of image stabilization, comprising:
    capturing a first image frame using a first set of gain and integration parameters, comprising analog gain and integration time based on image brightness;
    defining a first sub-part of the first image frame;
    determining a first sharpness score for the first sub-part;
    capturing a second image frame using a second set of gain and integration parameters, comprising a maximum analog gain setting;
    determining a second sharpness score for the second image frame based on at least a second sub-part of the second image frame;
    comparing the second sharpness score to the first sharpness score;
    adjusting analog gain and integration time for a next captured image based on the comparison of the second sharpness score to the first sharpness score; and
    capturing a third image frame using an analog gain setting between the setting for the first image frame and the maximum analog gain.

2. The method of claim 1, further comprising determining a third sharpness score for a third sub-part of the third image frame.

3. The method of claim 2, further comprising comparing the first, second, and third sharpness scores and determining analog gain and integration time settings based upon this comparison.

4. A method of image stabilization, comprising:
    receiving an image at a first frame using a first analog gain based on image brightness;
    defining a sub-frame of the first frame;
    determining a first sharpness score for the sub-frame;
    receiving a second frame of the image using maximum analog gain;
    determining a second sharpness score for a second sub-frame of the second frame;
    receiving a third frame of the image using an intermediate analog gain relative to that used for the first and second frames;
    determining a third sharpness score for a third sub-frame of the third frame;
    comparing the first, second, and third sharpness scores; and
    setting a final analog gain and an integration time based on the comparison of the first, second, and third sharpness scores.

5. The method of claim 4, wherein if the difference between a highest and lowest of the first, second, and third sharpness scores is within a predetermined range, the analog gain used for the first frame is used to save the image.

6. The method of claim 4, wherein if the third sharpness score is closer to the second sharpness score than to the first sharpness score, the analog gain setting used for the third frame is used for a saved image.

7. The method of claim 4, wherein if the third sharpness score is closer to the first sharpness score than to the second sharpness score, the analog gain setting used for the second frame is used for a saved image.

* * * * *